United States Patent [19]

Dutot et al.

[11] 3,998,178
[45] Dec. 21, 1976

[54] EASY-FIT SIGNAL UNIT FOR MOTOR VEHICLES

[75] Inventors: Christian Dutot; Jean Michel Dumontier, both of Boulogne-Billancourt, France

[73] Assignees: Regie Nationale des Usines Renault; Automobiles Peugeot, both of Paris, France

[22] Filed: Apr. 9, 1975

[21] Appl. No.: 566,400

[30] Foreign Application Priority Data

Apr. 11, 1974  France .............................. 74.12775

[52] U.S. Cl. .................... 116/28 R; 240/7.1 G;
293/66; 293/69 R; 293/71 R
[51] Int. Cl.[2] ................... B60Q 1/00; B60Q 1/02;
B60Q 1/26
[58] Field of Search ........... 116/28 R; 240/8.2, 8.3, 240/52.1, 8.16, 7.1 G; 40/129 C; 293/69 R

[56] References Cited

UNITED STATES PATENTS

| | | | |
|---|---|---|---|
| 1,781,865 | 11/1930 | Aniol | 240/8.2 |
| 3,225,189 | 12/1965 | Pendell | 240/52.1 |
| 3,375,367 | 3/1968 | Woodcock | 240/52.1 |
| 3,639,748 | 2/1972 | Pearson | 293/69 R |

*Primary Examiner*—S. Clement Swisher
*Assistant Examiner*—Denis E. Corr
*Attorney, Agent, or Firm*—Fleit & Jacobson

[57] ABSTRACT

The invention relates to an easy-fit signal unit for motor vehicle, this unit being disposed in a bumper section of moulded flexible material comprising a cavity for receiving said unit and means for retaining matching means formed on said unit. In said signal unit, the retaining means comprise male and female snap-action means formed at registering locations on said unit and on a deformable wall of said receiving cavity of said bumper section.

2 Claims, 5 Drawing Figures

EASY-FIT SIGNAL UNIT FOR MOTOR VEHICLES

The present invention relates to the fitting of signal unit or lamp mountings or holders, notably luminous devices such as direction indicators, flashing lamps, side lamps, etc . . . , on a motor vehicle.

As a rule, the fitting of such lamp units or similar devices requires a number of operations such as drilling the body portion to be used as a support, the fastening of intermediate members thereto, the screwing at several locations of the case containing the lampholders, etc . . . , so that most of these operations are relatively time robbing.

It is the essential object of the present invention to facilitate the mounting of such units or devices by incorporating them as much as possible to a novel structure of the front or rear portion of the vehicle.

Basically, the fitting of signal units to a motor vehicle according to this invention is characterised in that each unit is adapted to be inserted into a bumper section of flexible moulded material to constitute at least part of a mounting for said unit, said bumper section comprising retaining means matching or corresponding to means provided on said unit.

Figure 1:
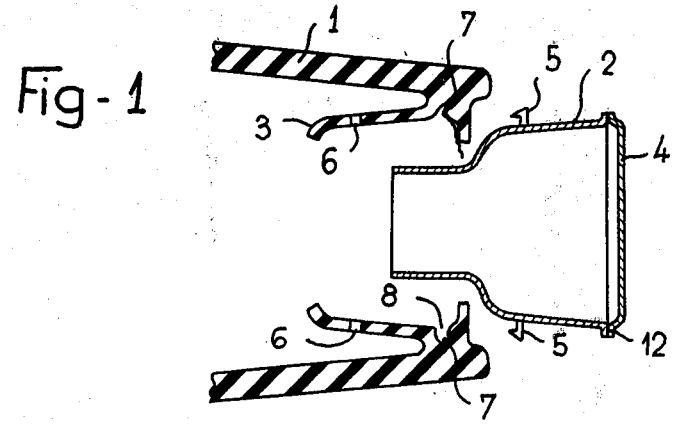
Figure 2:
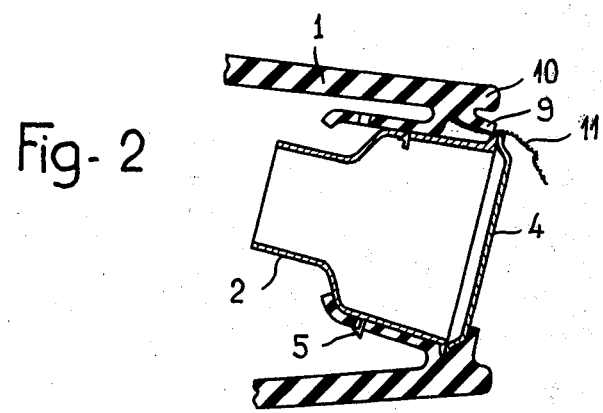
Figure 3:
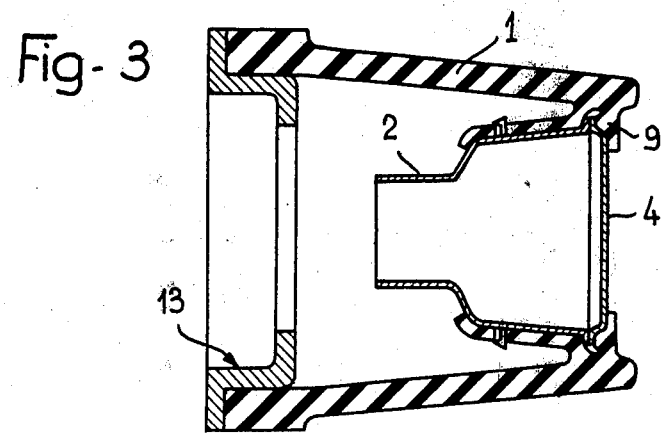
Figure 4:
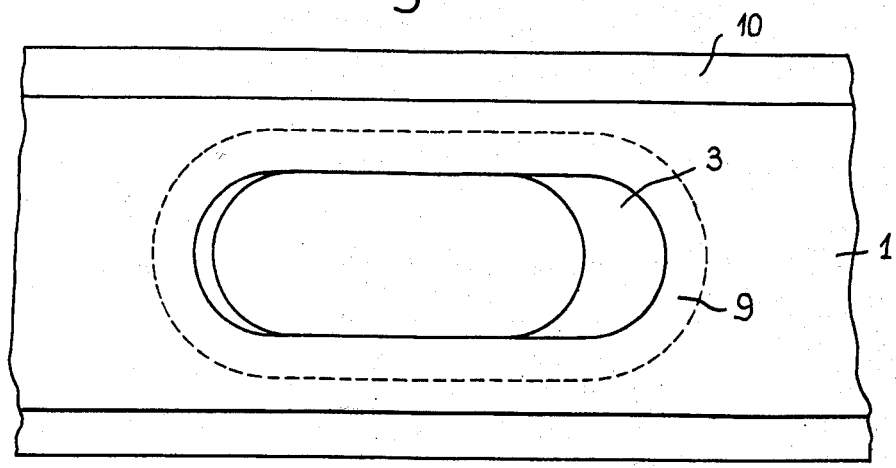
Figure 5:
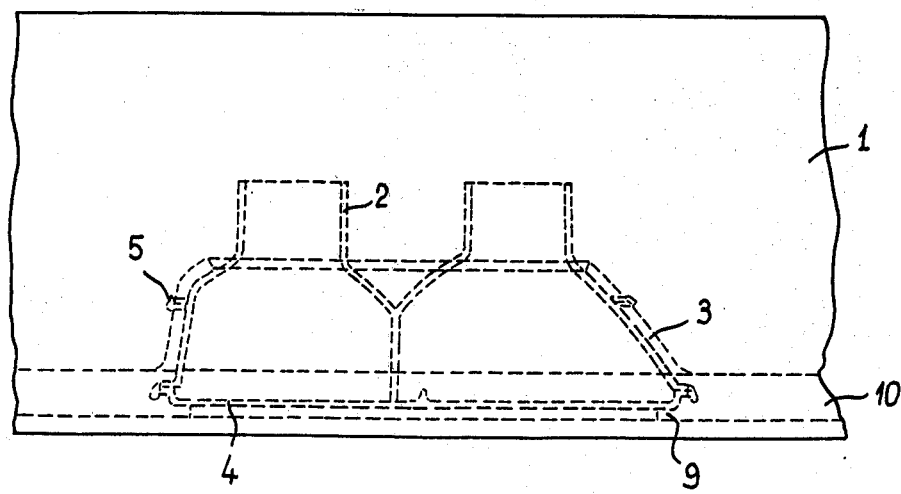

The invention will now be described by way of example with reference to the attached drawing, in which:

FIGS. 1 to 3 inclusive illustrate in vertical cross-section various stages of the mounting of an optical unit in a bumper section;

FIG. 4 is a front view of the bumper section, showing the location of the optical unit, and FIG. 5 is a plane view from above showing mainly in dash lines the final relative positions of the optical unit and bumper section.

Referring first to FIGS. 1 to 3 of the drawing, the bumper section 1 is shown in fragmentary vertical cross section and has a substantially U-shaped configuration comprising at the level for example of a reflector 2 of a lighting unit a cavity bounded by a wall 3 of corresponding volume. This cavity is formed integrally by moulding with the bumper section consisting for example of natural or synthetic rubber, or any other plastic material having similar properties, the cavity or bumper section being reinforced locally by means of fiberglass or metal inserts, this flexible section being adapted to be secured in a manner known per se to a front or rear cross member of the chassis of the motor vehicle.

The optical unit to be fitted, which may be either single or twin as illustrated in FIG. 5 consists essentially of a rear portion 2, in this case a reflector and lamp holder shown diagrammatically, and of a transparent or tinted cover 4 closing the front of the optical unit.

The latter comprises a lug 5 adapted to engage a corresponding aperture 6 formed in the wall 3 of the receiving cavity in order to constitute a retaining means.

A piece of string 7 is also provided which has one end 11 projecting outwards and its main section disposed along and inside a groove 8 formed at the rear of a flexible peripheral lip 9 adapted to cover the front peripheral portion of said cover 4 in order safely to retain same in position when said string 7 is pulled.

FIG. 5 illustrates the frustoconical configuration of the receiving cavity 3 moulded integrally with the rubber bumper section 1, together with the beads 10 projecting from the front of said bumper section to protect the optical unit in case of minor shocks and the peripheral lip 9 in its end position. For the same reason, the cross member supporting the bumper section 1, which may be a section member of the type illustrated at 13 in FIG. 3, is apertured behind the optical unit to permit the free backward movement of this unit in case of shock.

The relative positions of the various component elements are shown in FIG. 5. Thus, the twin optical unit engages the wall 3 of the receiving cavity, the male and female members 5 and 6 are fitted in their relative position of engagement by snap action and the flexible peripheral lip 9 is also shown in its final position.

The mounting procedure is as follows:

As shown in FIG. 1, the rear portion of the optical unit is presented from the front of the receiving cavity 3 and introduced into this cavity, whereafter, taking advantage of the flexibility of the rubber walls of said cavity, the optical unit is inclined to permit the engagement of its lower portion, i.e. the lug 5 is fitted into the aperture 6 and the rim or flange 12 of the cover joint is inserted into its groove 8 (FIG. 2).

To engage the upper portion of the cover joint flange 12 into said groove 8, the operator subsequently folds the flexible lip 9 in the forward direction by gradually pulling the projecting end 11 of string 7, which serves this purpose as it emerges from the groove 8 at te periphery of said flexible lip 9.

At the same time, the front cover 4 is pushed inwards to permit the final fitting in position of the light or signal unit illustrated in FIG. 3, in which said unit is retained by said lip 9.

Although a specific form of embodiment of this invention has been described hereinabove and illustrated in the accompanying drawing, it will readily occur to those skilled in the art that various modifications and changes may be brought thereto without departing from the scope of the invention as set forth in the appended claims.

What is claimed as new is:

1. An easy-fit signal unit for motor vehicles comprising, in combination, a bumper section of molded flexible material having an opening defining a cavity, at least one signal unit disposed within said cavity and means on the inner wall of said cavity and the outer surface of said unit for removably retaining said unit in said cavity, said retaining means comprising an annular lip of flexible material on said bumper section adjacent the forward end of said cavity, said lip being arranged for overlying relationship with the forward marginal edge portion of said unit in the asssembled position of said unit in said cavity and wherein the inner wall of said opening in said bumper section is provided with an annular retaining groove between said lip and the forward end of said cavity and including a piece of string secured at one end within said groove and having an outwardly projecting other end engageable with said lip to permit said lip to be positioned in said overlying relationship with the forward marginal edge portion of said unit.

2. An easy-fit signal unit in accordance with claim 1 including a rigid support having an aperture and wherein said bumper section is secured to said rigid support with said aperture in alignment with said unit to permit a backward movement of said unit in case of shock.

* * * * *